(No Model.)

A. O. BLOMGREN.
ENVELOPE OPENER.

No. 530,920. Patented Dec. 18, 1894.

Witnesses
J. W. Reynolds
Chas. S. Hyer

Inventor
Andrew O. Blomgren.
By John Wedderburn
Attorney

UNITED STATES PATENT OFFICE.

ANDREW O. BLOMGREN, OF GRANITE FALLS, MINNESOTA.

ENVELOPE-OPENER.

SPECIFICATION forming part of Letters Patent No. 530,920, dated December 18, 1894.

Application filed December 8, 1893. Serial No. 493,104. (No model.)

*To all whom it may concern:*

Be it known that I, ANDREW O. BLOMGREN, a citizen of the United States, and a resident of Granite Falls, in the county of Yellow Medicine and State of Minnesota, have invented certain new and useful Improvements in Envelope-Openers; and I do hereby declare the following to be a full, clear, and exact description of the invention, such as will enable others skilled in the art to which it appertains to make and use the same.

This invention relates to devices for opening envelopes and has for its object to provide means for cutting the ends of envelopes, whether of a thin or bulky nature, without injury to the contents.

With this and other objects in view, the invention consists of the construction and arrangement of the several parts which will be more fully hereinafter described and claimed.

Figure 1:
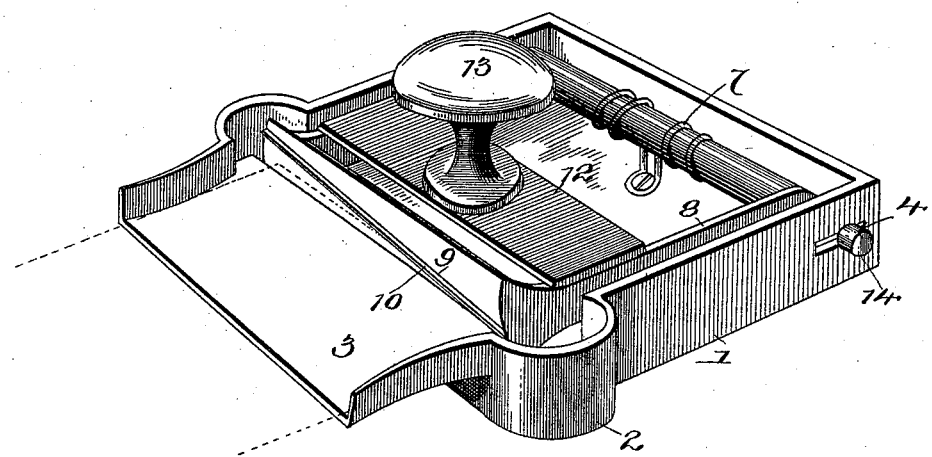
Figure 2:
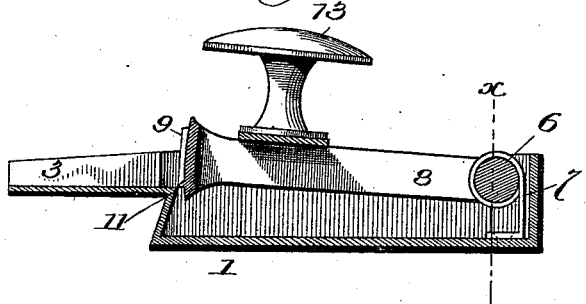
Figure 3:
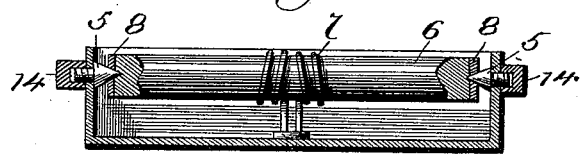

In the drawings:—Figure 1 is a perspective view of a device embodying the invention. Fig. 2 is a longitudinal section of the same. Fig. 3 is a transverse vertical section on the line *x x*, Fig. 2.

Similar numerals of reference are employed to indicate corresponding parts in the several views.

Referring to the drawings, the numeral 1, designates a casing or box, having at the front portion thereof two oppositely situated, semicircular bays or projections, 2, and above the bottom of the said casing or box, and extending forwardly or toward the front from the said bays or projections, is a feed tray or chute, 3, of suitable size and dimension, upon which the end of the letter to be opened is received.

The rear of the casing or frame 1 on opposite sides is slotted as at 4, and therein are adjustably mounted conical trunnions, 5, which removably engage the opposite ends of a rock shaft, 6, engaged at the center by a spring, 7, to restore the front to its normal position, as well as the parts connected thereto, said spring being attached also to the bottom of the casing or box 1, adjacent to the said rock shaft.

Extending forwardly from the opposite ends of the rock shaft are parallel bars or arms, 8, connected at the front by a curved cross piece, 9, having a cutting rib, 10, extending diagonally over the same in a longitudinal direction and working adjacent and close to the inner edge, 11, of the tray or chute, 3, to thereby produce a shearing action.

The front walls of the casing or box, 1, adjacent to the edge, 11, is inclined downwardly, so as to permit the cutting rib, 10, to have free and unimpeded movement after passing the said edge, 11, and also to permit the strip of material cut from the end of the letter to be forced downwardly into the casing or box.

The parallel arms or side bars, 8, are connected at the front by a horizontal strip, 12, to which is centrally attached an operating knob or handle, 13, and by which means downward pressure may be exerted on the side arms or bars and the parts connected thereto, against the repellant action of the spring, 7, the latter holding the said side arms or bars, as well as the cross strip carrying the cutting rib in elevated position, as shown in the accompanying drawings.

The rock shaft, 6, together with the side arms or bars and the cross strip, 9, form a cutting frame, and in the event of the cutting rib, 10, becoming worn, it can be adjusted up closely to the edge, 11, by loosening the trunnions, 5, and moving them in the slots, 4. The trunnions, 5, are held in place by removable cap nuts, 14, which project exteriorly on the opposite sides, as shown, and all the parts of the device as an entirety may be slightly varied in form and the minor details, as well as the proportions, without in the least departing from the nature or spirit of the invention.

It will be observed that the cutting rib, 10, stands high enough above the level of the tray or chute, 3, to permit the insertion of the end of the letter or package thereunder, without requiring an adjustment of the same through an elevation or through manipulation of the cutting frame, and this position of the cutting rib is normally sustained by the spring 7, as will be readily understood.

The co-incident bays formed at the opposite sides of the front of the casing or box, provide for the free operation of the cutter and permit the insertion of the fingers of the operator and remove the cut portions of the envelopes from under the cutter to avoid clogging, and allow the cut pieces to be pushed backward under the cutting frame and removed through the open portion thereof.

Having thus described the invention, what is claimed as new is—

In an envelope opener the combination of a casing or box having at the front portion thereof two oppositely situated, semi-circular bays or projections, a front feed tray or chute having an inner terminating straight edge, the said inner edge of the feed chute projecting part way into the bays and rear slots in the opposite sides of said casing, conical trunnions adjustably mounted in the said slots, a rock shaft supported by the said trunnions and having said arms extending forwardly from the opposite ends thereof with a diagonal cutting rib across the front cutting bar of the same, an operating handle and a spring engaging the center of the rock shaft and secured to the base of the casing, the said inner edge of the feed chute extending into the space formed by the bays and clear of the latter for the purpose of admitting the cutting rib to act against said edge without contact with adjacent parts, substantially as and for the purposes specified.

In testimony whereof I have signed this specification in the presence of two subscribing witnesses.

ANDREW O. BLOMGREN.

Witnesses:
OLE HARTWICK,
JOHN G. IVERSON.